Figure 1:
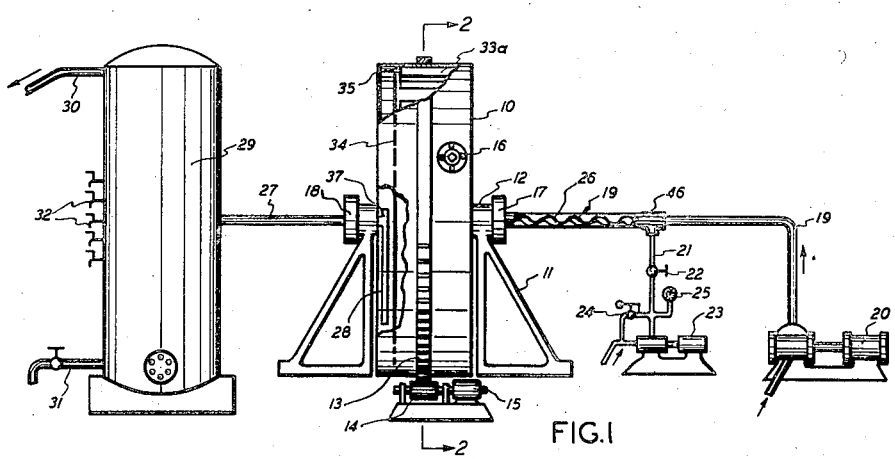

Sept. 25, 1934.    C. J. ROBINSON    1,974,693
METHOD OF PARTING CHEMICALLY TREATED EMULSIONS
Filed April 3, 1933

CHARLES J. ROBINSON
INVENTOR
ATTORNEY

Patented Sept. 25, 1934

1,974,693

UNITED STATES PATENT OFFICE 1,974,693

METHOD OF PARTING CHEMICALLY TREATED EMULSIONS

Charles J. Robinson, Claremont, Calif., assignor to L. Blake-Smith, San Francisco, Calif.

Application April 3, 1933, Serial No. 664,241

8 Claims. (Cl. 196—4)

The object of my invention is to provide a method for rapidly and completely parting the constituents of an emulsion while it is being resolved or after it has been resolved by treatment with chemicals.

It is well known that almost all emulsions, whether of the water-in-oil or the oil-in-water type, may be resolved by treating them with one or more of a large variety of chemically reactive materials.

This chemical treatment involves the addition to the emulsion of a flocculating agent or a counter-colloid, tending to produce an emulsion having as dispersed phase the liquid which constitutes the continuous phase of the emulsion to be treated, or in other words, to reverse the direction of the emulsion. A full discussion of this subject may be found in Bulletin 250 of the U. S. Bureau of Mines, 1926.

In this bulletin and in numerous patents to Barnickel, DeGroote and others, many substances are named as suitable for use in chemical treatments, as for instance water soluble salts (as sodium chlorid or sulfate) and water soluble soaps (as the sodium salts of the fatty acids or sulfonated fatty acids), these being suitable for resolving emulsions in which water is the dispersed phase, and oil soluble soaps (such as the calcium salts of the fatty acids) and oil soluble fatty acid esters for resolving emulsions in which oil is the dispersed phase.

The treatment of petroleum emulsions with chemicals, i. e., with soluble substances tending to reverse the direction of the emulsion, is a well developed art and I claim no invention therein as regards the reactive materials used in such treatment, my invention being directed solely to the coalescence and removal of the minute particles of dispersed liquid set free by any preferred chemical treatment.

The effective limit of any chemical treatment is reached when the emulsion is destabilized, that is to say, when it is placed in such condition that there is no longer any inherent resistance (such as that set up by protective films or unbalanced surface tensions) to the coalescence of the minute droplets or dispersed liquids into such larger drops as will spontaneously settle. The mere addition and diffusion of suitable chemicals in the emulsion does not produce any positive tendency toward coalescence, but stops short at that point where internal resistances other than that due to the fluid friction of the continuous liquid are destroyed or neutralized.

As the ultimate aim of any demulsification treatment is the production of an oil free from water, the chemical resolution above described must be supplemented by a step which will set up a positive tendency for the dispersed particles to move toward each other against the resistance offered by fluid friction and thus to mutually contact and coalesce into particles of such size as to settle out of the continuous liquid.

In prior practice this tendency has been set up in various ways: by heating, to produce convection currents; by long standing of a previously heated body, in which convection currents are produced by localized cooling; by agitation with air or paddles; by circulating out of and into a body of liquid as by pumping; by passing the emulsion body over baffles arranged to produce a multidirectional flow, and by passing the liquid through narrow and circuitous channels such as exist in a pack of excelsior, shavings or hay, the latter being colloquially termed the "haystack" method.

Figure 2:
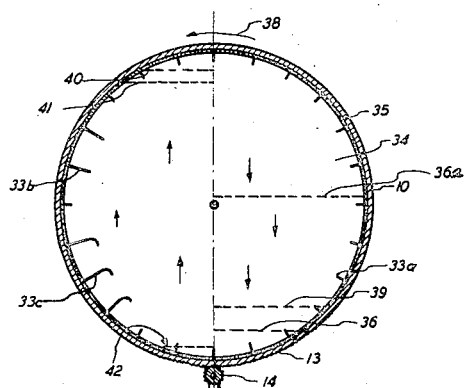
Figure 3:
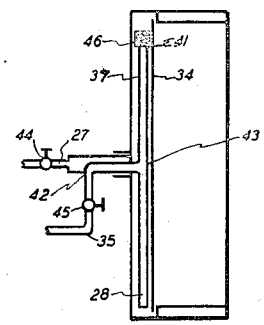

My invention is an improvement over the "haystack" method in certain respects which will be apparent after a consideration of the attached drawing and the following description thereof, in which Fig. 1 is an elevation of a suitable apparatus, parts being broken away to show internal construction, this apparatus being illustrative only and not limiting;

Fig. 2 is a vertical section of the revolving drum, as on the line 2—2 of Fig. 1, and Fig. 3 is a longitudinal section of the drum 10, showing a modified arrangement of piping.

Referring to the drawing, 10 is a drum or shortened cylinder supported by the standards 11, the upper ends of which carry suitable bearings to support the drum at the center of its heads as at 12. The drum is revolved by means of a rack 13 and a pinion 14 driven by any source of power such as the motor 15. The relation between the length and the diameter of the drum may be varied within wide limits, as may also the means by which it is supported and revolved. The drum is provided with any suitable means for introducing granular solids, such as the flange and plug indicated at 16.

The central projections from the ends of the drum are provided with any preferred type of packed joint by means of which a fixed pipe can be nonleakably passed through a revolving head, these joints (which are entirely conventional) being indicated at 17 and 18. Through the joint 17 I pass a pipe 19 through which emulsion to be treated is introduced by means of the pump 20. At a point 46 intermediate the pump and the drum I introduce a branch pipe 21 controlled by a sensitive valve 22 and supplied with liquid treating agent by means of a pump 23. The suction and discharge of this pump may desirably be bypassed as at 24 through a weighted or spring controlled relief valve, to maintain a constant pressure on the control valve 22, and this pressure may be indicated on a pressure gauge 25.

It is highly desirable to thoroughly intermix the entering emulsion with the chemical before the two liquids enter the drum, for the reason that chemical treatments are particularly susceptible to overdosage and to ensure that the emulsion receives a constant and uniform proportion of chemical. I therefore show at 26 a helix within an enlarged portion of the pipe 19, by which a gentle but thorough intermixture of the liquids may be produced.

Through the joint 18 I introduce a pipe 27 which is turned downwardly within the drum as indicated at 28 and which leads into any closed tank which acts as an oil-water separator, settled oil overflowing at 30 while water is withdrawn at 31 to maintain a constant parting line as determined by the test cocks 32 or their equivalent.

The drum 10 is provided internally with vanes which may be of slight height as indicated at 33a, or of greater relative height as indicated at 33b, or may be of curved section as indicated at 33c. The drum may also be provided with a baffle plate 34, attached to and rotating with the shell, this baffle being of such diameter as to leave an annular space 35 between its perimeter and the interior circumference of the shell. The purpose of this baffle is to retain within the shell the granular solids, about to be described, while permitting fluids to circulate past it. If the baffle is used, the vanes 33 should terminate just short of the baffle, while if it is not used, the vanes are preferably of the full length of the shell.

My invention may be summarized as comprising an essential step and a desirable secondary step. The essential step is the projection through the body of emulsion, while undergoing or after treatment with chemicals, of granules of a solid wetted by the liquid of the disperse phase, this projection taking the direction in which the disperse liquid tends to gravitate. Thus, if the emulsion is of the common oil-field or water-in-oil type, the granules are caused to pass downwardly through the liquid body, are water-wetted and must be at least slightly heavier than water, while if the emulsion is of the oil-in-water type the granules are caused to pass upwardly through the liquid body, are oil-wetted and are necessarily lighter than the oil component of the emulsion.

The secondary step, which has for its object a continuous operation at a reduced cost, is to collect the granules on that side of the body to which they gravitate and return them to the opposite side of the body to again pass therethrough.

Both of these steps are performed in the described apparatus as a continuous process, but the first may be performed independently of the second, as a batch process.

Describing the operation as applied to the resolution and separation of a water-in-oil emulsion, a charge of heavier-than-water granules is introduced into the drum by removing plug 16. This charge may fill the drum to the level indicated at 36 in Fig. 2, this level being suggestive only. Emulsion mixed with the proper proportion of chemical, either by the means suggested at 19—26 in Fig. 1 or by other means, is then introduced into the drum through pipe 19 up to a level 36a which is substantially fixed by that of the upper end of the short gas vent 37 of Fig. 1. As the actual resolution of the emulsion by the chemical takes place with considerable rapidity, the liquid contents of the drum may now be assumed to be oil containing an extremely fine and intimate diffusion and suspension of free water particles.

On revolving the drum in the direction indicated by arrow 38 the heavy granules will be lifted by vanes 33 to a point above the center line of the drum and poured back into the liquid in its upper portion or preferably above its upper surface, thence passing down through the oil to rejoin the body of granules in the bottom of the drum. If the vanes are very shallow and the rate of revolution low, most of the granules will be discharged close to the rising side of the shell, but by sufficiently increasing the height and accelerating the rotation the granules may be evenly distributed over the entire upper surface of the oil body.

In passing downwardly through the oil containing minute water droplets, the water wet surfaces of the granules are brought into contact with a multiplicity of such droplets, which immediately coalesce to form a film of water surrounding each granule. As the granules come to rest on the bottom of the drum, these films in turn coalesce to form a body of segregated water whose upper level is fixed by the position of the lower end of pipe 28, as at 39 in Fig. 2.

On continuing the supply of chemically treated emulsion the water is continuously removed and the segregated water and oil pass together, in the proportions in which they are liberated, through pipe 28 into pipe 27 and thence to the parting vessel 29, from which they may separately be withdrawn. As the resolution products are completely segregated when they enter this vessel, separation therein occurs very rapidly, practice having shown that in most cases a vessel having cubic capacity equal to the drum throughout for one-half hour is amply sufficient to effect a substantially complete parting of water from oil.

Where an oil-in-water emulsion is being treated with a solid lighter than the oil, the granules pass upwardly through the oil body and form a layer on its upper surface as between the lines 40 and 41 of Fig. 2. In this case the water body is maintained at the lowest possible level, as at 42, by lengthening the outlet pipe 28 until it barely clears the vanes, and the drum is carried substantially full of oil, up to say the line 40, by lengthening the pipe 35 to the degree shown in Fig. 3 and terminating it with a screen 46 sufficiently coarse to freely pass the oil while holding back any granules which may pass the baffle 34. Fig. 3 also shows that the oil withdrawal pipe 37 may be carried into the drum through the water withdrawal pipe 28, a leak-tight joint being formed at 42 and the two pipes being provided with control valves 44 and 45 and separately carried into the separating vessel 29, both at or near its mid-height.

The solid materials of which the granules are formed are selected with a view to their wettabilities, their weight and their hardness. Characteristic water wettable substances are hematite, magnetite, flint glass, crystalline silica, and alundum. These substances should be selected in the hardest possible varieties in order to avoid undue loss by abrasion. Their water separating effect, other things being equal, will vary directly with their specific gravity, and the heaviest specimens having other suitable properties should be chosen.

Characteristic oil wettable substances lighter than water are difficult to find in nature and must in most cases be prepared artificially. Small cubes or rounded pellets of wood or cork, well dried and wetted with oil, are highly oil wettable but gradually become saturated with oil and lose the requisite lightness. Pellets of inflated or "vesiculated" clay may be made very light and with a dense outer skin which will resist oil penetration for a long time. These must be kept out of long continued contact with water as their preference for oil is slight and also they must be well oiled before use.

The sizes in which these materials are used may be varied over a considerable range. The heavy materials should not be smaller than will be retained on a 20-mesh screen and may be up to ¼" or even larger. The light materials are preferably of a larger size range, not smaller than ⅛" and up to say ⅜". None of these sizes should be considered as limiting, as good results may be obtained outside of the ranges suggested.

The advantages accruing to the use of my invention, as compared with previous methods of utilizing chemical reagents, are as follows: The temperature to which the emulsion must be heated to reduce its viscosity is greatly lowered. This applies particularly to water-in-oil emulsions in which the continuous phase is often highly viscous at normal temperatures, but which may be separated by my method with little or no heating, resulting in a material economy of fuel. Emulsions which separate slowly after chemical treatment alone may be separated with great rapidity by the application of my wetted granules. When the operation is performed continuously, the chemical treatment being coincident and conterminous with the mechanical separation, a separation which would otherwise require hours or days may be completed within an hour and at a much lower temperature, avoiding to the greatest degree the loss of volatile constituents from the oil. Finally, because of the perfect intermixture of reagent with emulsion produced by the passage of the granules through the emulsion body, a valuable saving of reagent may often be effected.

I claim as my invention:

1. The method of separating the phases of an emulsion which comprises: intimately intermingling with said emulsion a chemically active reagent in quantity sufficient to bring said emulsion to a state of instability; and passing through said emulsion, in only the direction in which the dispersed phase thereof tends to gravitate, dispersed granules of an insoluble solid wetted by the liquid of said dispersed phase.

2. The continuous method of separating the phases of an emulsion which comprises: intimately intermingling with a flowing body of said emulsion a chemically active reagent in quantity sufficient to bring said emulsion to a state of instability; and simultaneously passing through said flowing body, in only the direction in which the dispersed phase of said emulsion tends to gravitate, dispersed granules of an insoluble solid wetted by the liquid of said dispersed phase.

3. The method of separating the phases of an emulsion in which water is the dispersed phase, which comprises: intimately intermingling with said emulsion a chemically active reagent in quantity sufficient to bring said emulsion to a state of instability; and passing through said emulsion, in only a downward direction, water-wetted dispersed granules of an insoluble solid.

4. The continuous method of separating the phases of an emulsion in which water is the dispersed phase, which comprises: intimately intermingling with a flowing body of said emulsion a chemically active reagent in quantity sufficient to bring said emulsion to a state of instability; and simultaneously passing through said flowing body, in only a downward direction, water-wetted dispersed granules of an insoluble solid.

5. The continuous method of separating the phases of an emulsion which comprises: intimately intermingling with a flow stream of said emulsion a chemically active reagent in such proportion as to bring said emulsion to a state of instability; retarding the flow of said stream in a flowing body; continuously passing through said body, in only the direction in which the dispersed phase of said emulsion tends to gravitate, a stream of dispersed granules of an insoluble solid wetted by the liquid of said dispersed phase, whereby minute particles of said dispersed phase are coalesced, and continuously withdrawing separated emulsion constituents from said body.

6. The continuous method of separating the phases of an emulsion in which water is the dispersed phase, which comprises: intimately intermingling with a flow stream of said emulsion a chemically active reagent in such proportion as to bring said emulsion to a state of instability; retarding the flow of said stream in a flowing body; continuously passing through said body, in only a downward direction, a stream of water-wetted dispersed granules of an insoluble solid, whereby minute particles of dispersed water are coalesced, and continuously withdrawing separated emulsion constituents from said body.

7. The continuous method of separating the phases of an emulsion which comprises: intimately intermingling with a flow stream of said emulsion a chemically active reagent in such proportion as to bring said emulsion to a state of instability; retarding the flow of said stream in a flowing body; continuously projecting through said body, in one general direction, a stream of dispersed granules of an insoluble solid wetted by the liquid of said dispersed phase, whereby minute particles of said dispersed phase are coalesced; collecting said granules on the side of said body toward which they are projected; returning said collected granules in masses to the opposite side of said body to be again dispersed and to again pass through said body, and continuously withdrawing separated emulsion constituents from said body.

8. The continuous method of separating the phases of an emulsion in which water is the dispersed phase, which comprises: intimately intermingling with a flow stream of said emulsion a chemically active reagent in such proportion as to bring said emulsion to a state of instability; retarding the flow of said stream in a flowing body; continuously passing through said body, in only a downward direction, a stream of water-wetted dispersed granules of an insoluble solid, whereby minute particles of dispersed water are coalesced to form a water body below said emulsion body; collecting said granules in said water body; returning said collected granules in masses to the upper side of said emulsion body to be again dispersed and to again pass therethrough, and continuously withdrawing separated emulsion constituents from said flowing body.

CHARLES J. ROBINSON.